March 15, 1932.  E. MAYWALD ET AL  1,850,023
SPRINKLER SUPPORT
Filed Sept. 19, 1930
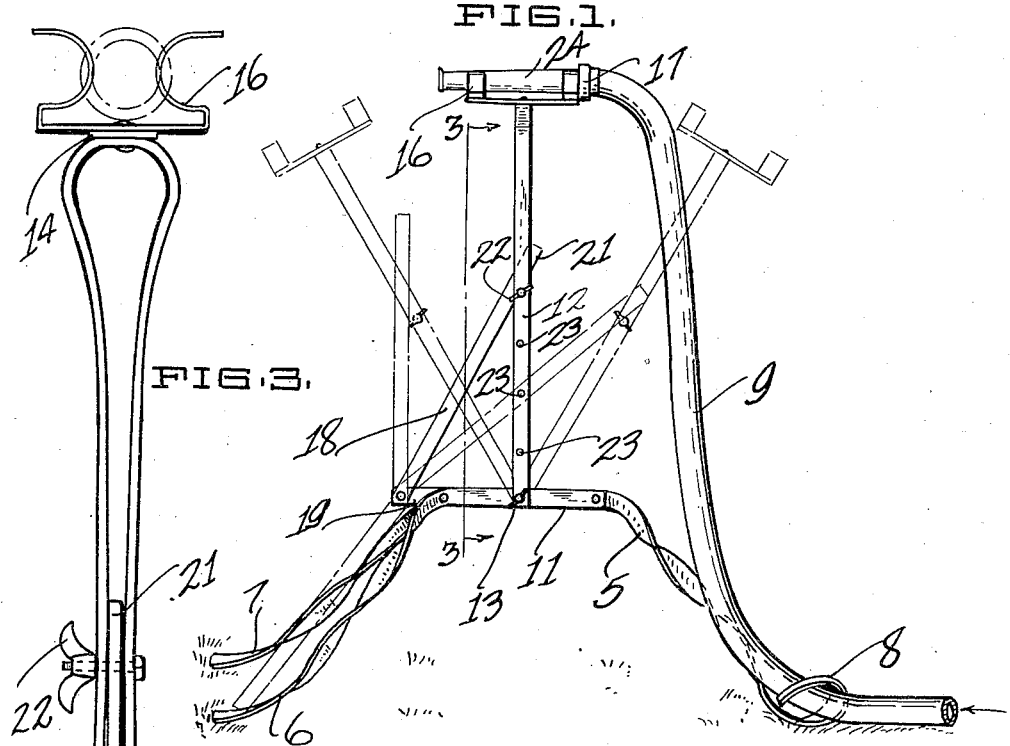
INVENTORS
EDWARD MAYWALD
ELMER A. ROBERTS
BY
Victor J. Evans
ATTORNEY.

Patented Mar. 15, 1932

1,850,023

UNITED STATES PATENT OFFICE

EDWARD MAYWALD, OF MAYFIELD, AND ELMER A. ROBERTS, OF BURLINGAME, CALIFORNIA

SPRINKLER SUPPORT

Application filed September 19, 1930. Serial No. 483,074.

This invention relates to improvements in sprinkling devices, and has particular reference to a hose holding bracket, whereby an ordinary hose nozzle may be used as the sprinkling head.

The principal object of this invention is to produce a device of this character which is simple in construction and neat in appearance.

A further object is to produce a device wherein the sprinkler may be moved while in action, simply by drawing upon the rear portion of the hose.

A further object is to produce a device of this character wherein adjustments may be readily made to accommodate various angles to which the sprinkler is to be adjusted.

Other objects and advantages will be apparent during the course of the following description.

In the accompanying drawings forming a part of this specification and in which like numerals are employed to designate like parts throughout the same, Figure 1 is a side elevation of our device as the same would appear in use, Figure 2 is a top plan view of Fig. 1, Figure 3 is an enlarged cross-sectional view taken on the line 3—3 of Fig. 1, and Figure 4 is an enlarged top plan view of the nozzle holding clamp.

In the sprinkling of yards, flower beds and the like, it is often desirable to have the spray directed upon one portion of the garden for a considerable length of time. It is also desirable to be able to quickly move the spray from one point to another. Applicant has therefore produced a bracket in which an ordinary hose nozzle may be clamped and may be moved from point to point without the operator soiling either the hands or clothes.

In the accompanying drawings wherein for the purpose of illustration is shown a preferred embodiment of our invention, the numeral 5, 6 and 7 designate legs which may be of any desired shape, the leg 5 having a curved end 8 thru which the hose 9 is adaptedly threaded. These legs all join to form a bridge portion 11, to which a substantially U shaped support 12 is attached, as by a thumb nut 13. This support has pivoted to its upper end a T-head 14 to which is secured resilient clamps 16 and 17. A brace 18 is pivoted to the end of the leg 5 which extends beyond the bridge portion 11 as shown at 19 and has its opposite end 21 extending between the two legs of the support 12 so as to be engaged by a wing-nut 22, which wing-nut may be moved into various openings 23 formed in the support 12. Thru this arrangement the support 12 may be moved into one of the other positions shown in Fig. 1, and said brace 18 being pivoted to the end of the leg 5 functions also to act as an auxiliary ground support and rest for the device, when it is lowered, as disclosed to advantage in Fig. 1. The hose 9 carries a nozzle 24, which nozzle is engaged between the clamps 16 and 17, and as a result, will be securely held therein. When the device is in operation, the same may be moved by pulling upon the hose at a point remote from the nozzle holder, and due to the engagement of the hose with the curved end 8, the same will drag over a rough surface such as the ground of a garden without tipping.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:—

A device of the character described comprising a plurality of spaced legs secured together by a bridge portion, and having their free extremities spaced apart, a support carried by said bridge portion and adapted to support a clamp at its free end, one of said legs having a curved end adapted to have a hose pass therethru, whereby the nozzle of said hose will be engaged by said clamp, and a brace extending between said bridge portion and said support, said brace being pivotally connected to the leg having the curved end and in alignment therewith, and adapted when in a raised position to adjustably secure said support and when in a lowered position to serve as an auxiliary ground support and rest for said device.

In testimony whereof we affix our signatures.

EDWARD MAYWALD.
ELMER A. ROBERTS.